G. A. BOWMAN & C. L. HARMEYER.
LOCOMOTIVE STRAINER.
APPLICATION FILED JULY 16, 1908.

946,199.

Patented Jan. 11, 1910.

2 SHEETS—SHEET 1.

WITNESSES:
Helen J. Glenn.
J. H. Taylor

INVENTORS
George A. Bowman and
Cyrus L. Harmeyer
BY
Elwin M. Hulse
their ATTORNEY G. A. BOWMAN & C. L. HARMEYER.
LOCOMOTIVE STRAINER.
APPLICATION FILED JULY 16, 1908.
946,199.
Patented Jan. 11, 1910.
2 SHEETS—SHEET 2.
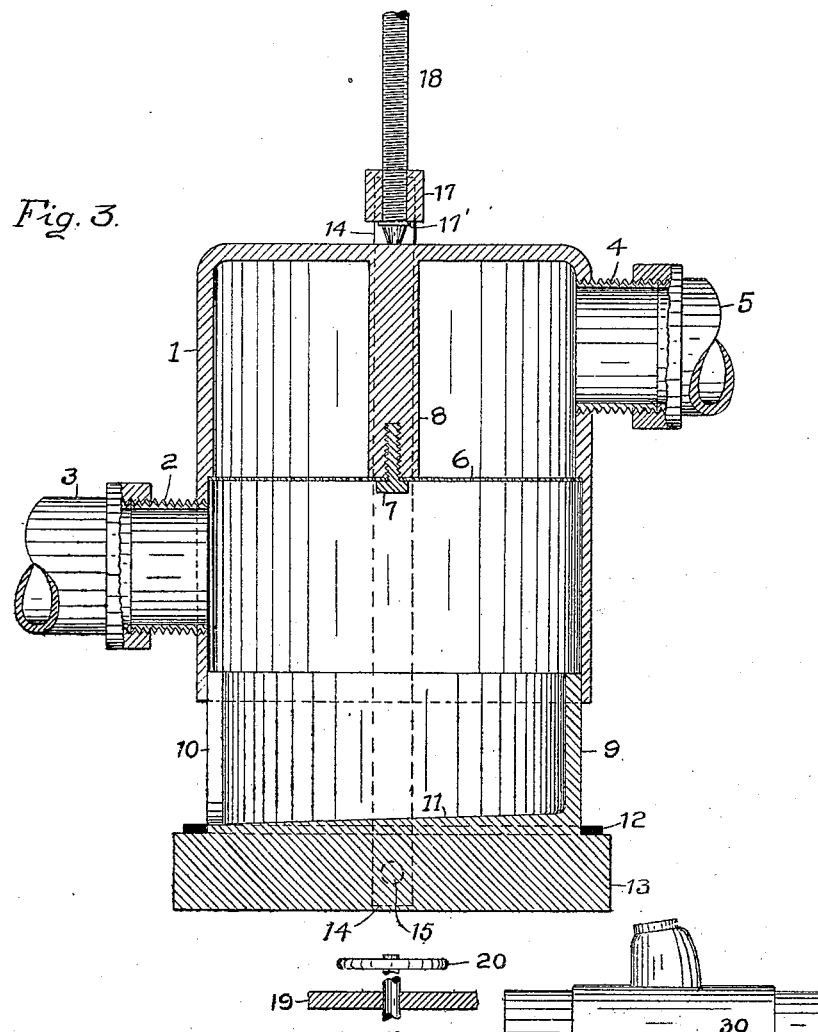
WITNESSES:
Helen F. Glenn.
S. K. Taylor.
INVENTORS
George A. Bowman &
Cyrus L. Harmeyer
BY
Elwin M. Hulse
Their ATTORNEY

UNITED STATES PATENT OFFICE.

GEORGE A. BOWMAN AND CYRUS L. HARMEYER, OF FORT WAYNE, INDIANA.

LOCOMOTIVE-STRAINER.

946,199.      Specification of Letters Patent.      Patented Jan. 11, 1910.

Application filed July 16, 1908. Serial No. 443,794.

*To all whom it may concern:*

Be it known that we, GEORGE A. BOWMAN and CYRUS L. HARMEYER, citizens of the United States, residing at Fort Wayne, in the county of Allen and State of Indiana, have invented a new and useful Locomotive-Strainer, of which the following is a specification.

Our invention relates to improvements in locomotive boiler strainers, in which a screen placed in the path of the water flowing from the tender tank to the locomotive boiler obstructs the passage of foreign matter in the water, said matter being deposited in a receptacle where it can be removed without delay or difficulty. Most strainers now in use for this purpose are attached to the bottom of the tank, the screen being cylindrical in form and attached to a removable bottom plate. The water in the tank passes into the interior of the screen and thence out through the meshes of the screen into the hose or pipe which leads to the locomotive boiler. The dirt, stones, coal, grass and other substances which get into the tank pass with the water into the screen and are retained by it. In time the flow of the water is retarded to such extent that an insufficient quantity of water is supplied to the boiler, and the bottom plate with the screen must be removed for cleansing. It often happens that a locomotive, while out on the road, is improperly fed with water because the screen has become clogged to such an extent that the water cannot flow through it. In this condition of affairs it becomes necessary to stop the locomotive and remove the screen and take out the clogging matter. This operation necessitates a delay to the train which obviously it is important to avoid, and the objects of our invention are to provide a strainer, the screen of which will prevent the passage of objectionable foreign matter into the boiler, those substances being permitted to fall away from the screen and be deposited at a distance therefrom; and to so construct the device that those foreign substances may be ejected from the same by the engineer or fireman without leaving or stopping the locomotive.

With these objects in view our invention consists in the novel features of construction described hereinafter and set forth in the claims.

Figure 1:
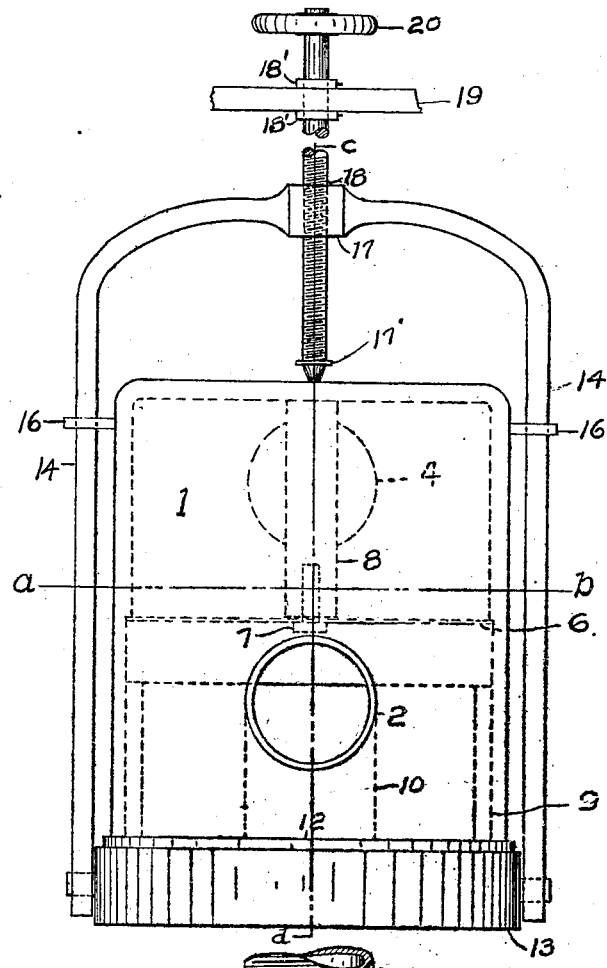
Figure 2:
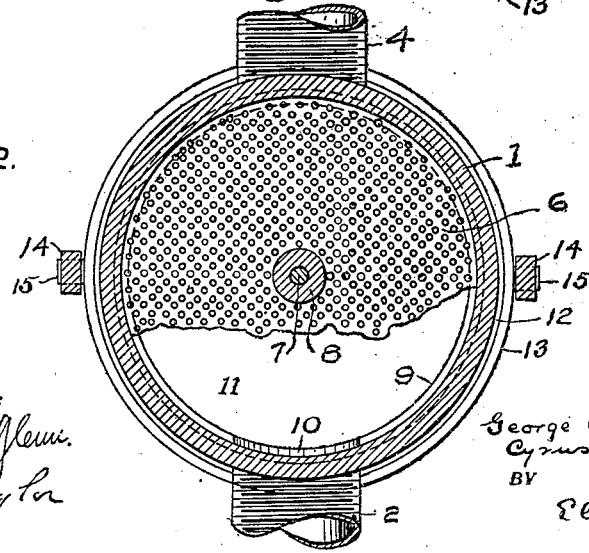

In the drawings Figure 1 is an elevational view of our invention; Fig. 2, a sectional view on line *a—b;* Fig. 3 a view on line *c—d,* with the receiving receptacle partially extended; Fig. 4, a view of a modification.

Referring to the drawings we provide a receptacle 1 closed at its upper end, and having a connection 2 adapted to be coupled to the hose or pipe 3 which leads from the tank, and a connection 4 adapted to be coupled to the pipe 5 which leads to the boiler. Within this receptacle between the two connections 2 and 4 we support in a convenient manner a horizontally disposed screen 6, by a screw 7 which engages a lug 8 on the under side of the top. Another receptacle or cup 9 adapted to closely fit or telescope within receptacle 1 is provided with a slot 10 registering with connection 2 to permit the water entering through that connection to pass into receptacle 9. The inner face of bottom 11 of this receptacle is inclined toward slot 10 so that all substances falling thereon will be easily removed as hereinafter described. A suitable packing 12 rests on a flange 13 extending out from the bottom of receptacle 9 and is adapted to form a seat for the bottom edge of receptacle 1. A yoke 14 is attached to the bottom flange 13 of receptacle 9, a pin 15 engaging an opening in the end of each arm of the yoke, or the yoke may be attached in any other convenient and suitable manner. Guides 16 prevent lateral movement of the yoke as it is raised or lowered. Cross head 17, which forms part of the yoke 14, is provided with a threaded opening which receives a shaft or rod 18 also threaded for some distance along its lower portion. This shaft 18 passes up into the cab of the locomotive at a convenient point, or may be located at any other point convenient to the engine men, and all longitudinal movement thereof is prevented by collars or stops 18' which are disposed on the shaft and about a bar 19, or other convenient part attached to the locomotive. Shaft 17 is rotated by wheel 20. When this shaft is rotated, no longitudinal motion on its part being possible, yoke 14 must rise or descend, as the case may be. A collar 17' fixed at a desired point on shaft 18 limits the downward movement of cross head 17. The lower end of shaft 18 is adapted to bear against the top of receptacle 1 so as to enable the operator to draw lower receptacle 9 tight against upper receptacle 1 and thus render the joint fluid tight.

In Fig. 4 we show a modified form of the connections by which receptacle 9 may be moved to the discharge position. In place of yoke 14 we extend rod 18 down through both receptacles and provide in the bottom 13 a recess 31 in which is revolubly retained a flange 32 on the lower end of the rod to prevent any upward movement of the rod away from bottom 13 on restoring receptacle 9 to its normal position within receptacle 1. Stuffing boxes 33 and 34 on the top and bottom prevent all leakage from the interior of the device. Rod 18 is preferably provided with threads 35 which are operative within a threaded opening in lug 8, the outside of the lug 8 being threaded to engage a nut 36 by which screen 6 is held to said lug. In this modified form rod 18 would have to move with receptacle 9; hence a loose connection with support 19 is necessary.

In operation the water flows into the receptacles, through connection 2; thence up through screen 6 and out through connection 4 to the boiler. The meshes of the screen being small, all dirt, coal, grass, etc., usually found in locomotive tanks, cannot pass through them, but fall to tne bottom of receptacle 9. If the accumulation of debris in that receptacle becomes sufficiently great to interfere with the flow of the water, the engineer or fireman turns wheel 20 in the proper direction to force down receptacle 9; slot 10 is then exposed to the outside and the water entering through connection 2 washes out the interior of the receptacle through slot 10, which slot should be large enough to permit the escape of any substance that may enter the hose or pipe leading from the tank. Since the inner face 11 of the bottom of receptacle 9 is inclined toward slot 10, the substances tend to approach that slot by gravity and the cleaning of the interior of the receptacle is more easily and completely accomplished than if said face were level. Furthermore, the steam pressure which operates the injector 30 may be turned back through pipe 5 into receptacle 1 where it passes through the screen 6, forcing therefrom any debris which may be clinging there to it, and thence into receptacle 9, from which the steam forces the debris that has collected therein and thus coacts with the water in cleansing the device.

It is thus seen that by our invention we have a straining device which frees the water of all objectionable substances, causes those substances to be deposited at a distance from the screen and enables the locomotive operators to remove those substances from the strainer while the locomotive is in motion, thus saving a large amount in time and assuring an uninterrupted supply of water to the locomotive boiler.

It is apparent that our device may be placed at any convenient point in the pipe line leading from the tender tank to the boiler, and the operating means carried up to any convenient height and located at any place on the locomotive (on the tender or in the cab) that may be desirable, one of the important points of our invention being that the movable receptacle shall be operative from the locomotive while the latter is in motion.

Many modifications of the structure illustrated and described will be possible, but all such will be equally within our invention; hence we do not wish to be limited to the precise structure described.

Our device is adapted to be used with boilers other than locomotive boilers.

What we claim is:

1. A device of the class described comprising two telescoping members, one of said members having an inlet and an outlet fluid connection, and a screen disposed between said connections, and the other member having a slot in the side thereof and provided with means for moving the said member in and out of the first member.

2. A device of the class described comprising two telescoping fluid receptacles, the upper receptacle having two fluid connections mounted therein and a screen disposed within the receptacle and between the connections, the lower receptacle having a slot in the side thereof, a bottom inclined toward said slot, and means connected to said bottom by which the lower receptacle may be moved in and out of the upper receptacle.

3. A device of the class described comprising two telescoping fluid receptacles, the upper receptacle being fixed and having two fluid connections therein and a screen horizontally disposed between the connections, the lower receptacle being movably supported within the upper receptacle by means operative from the locomotive cab, said lower receptacle having a slot in the side thereof and a bottom inclined toward the slot.

4. In a device of the class described the combination of a receptacle having a closed top, a connection for the inlet of fluid, a connection for the outlet of fluid and a horizontally disposed screen supported between said connections of a receptacle having a slot in the side thereof and a bottom, and means connected to said latter receptacle by which said latter receptacle is movably supported within the former receptacle whereby the slot or opening may be exposed to the outside.

5. In a device of the class described the combination with a fixed passageway for fluid having therein a horizontally disposed screen, of a receptacle supported within said passageway having an opening normally closed by the passageway and means operative at a distance therefrom whereby the receptacle may be moved out of said passageway to expose the opening to the outside.

In witness whereof we hereunto subscribe our names in the presence of two witnesses.

GEORGE A. BOWMAN.
CYRUS L. HARMEYER.

Witnesses:
ELWIN M. HULSE,
HELEN F. GLENN.